(12) United States Patent
Yada et al.

(10) Patent No.: US 7,974,667 B2
(45) Date of Patent: Jul. 5, 2011

(54) MOBILE TERMINAL DEVICE

(75) Inventors: Haruyoshi Yada, Kawasaki (JP);
Manabu Matsushima, Kawasaki (JP);
Yoshifumi Kajiwara, Kawasaki (JP);
Kenta Sugimori, Kawasaki (JP);
Hiroshi Kubo, Kawasaki (JP); Kurumi Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/749,119

(22) Filed: Mar. 29, 2010

(65) Prior Publication Data
US 2010/0246120 A1 Sep. 30, 2010

(30) Foreign Application Priority Data
Mar. 31, 2009 (JP) .................................. 2009-088394

(51) Int. Cl.
*H04M 1/00* (2006.01)
(52) U.S. Cl. .................. 455/575.4; 455/575.1; 455/90.3; 455/575.3
(58) Field of Classification Search ............... 455/575.4, 455/575.1, 575.3, 90.3, 575.8, 550.1
See application file for complete search history.

(56) References Cited

U.S. PATENT DOCUMENTS

| 6,547,575 B2 * | 4/2003 | Kato et al. ..................... 439/165 |
| 2007/0297727 A1 * | 12/2007 | Ueno et al. ...................... 385/93 |
| 2008/0096619 A1 | 4/2008 | Kuga et al. |
| 2009/0137293 A1 * | 5/2009 | Yoo et al. .................... 455/575.4 |

FOREIGN PATENT DOCUMENTS

JP 2008-103989 A 5/2008

* cited by examiner

*Primary Examiner* — John Lee
(74) *Attorney, Agent, or Firm* — Westerman, Hattori, Daniels & Adrian, LLP

(57) ABSTRACT

An information terminal device that includes a first housing electrically and movably connected to a second housing via a cable, the first housing includes a first substrate, a cable guide member having a portion of the cable therein so that the cable guide member guides an end portion of the cable to the first substrate, and a cable cover member which integrally includes a cable surrounding unit which covers the portion of the cable in the cable guide member and a sensor holding unit which holds a detection sensor for detecting the position of the second housing in relation to the first housing.

4 Claims, 7 Drawing Sheets

FIG. 1

CLOSED STATE

FIG. 2

OPEN STATE

FIG. 3

ROTATE STATE

MOBILE TERMINAL DEVICE

CROSS-REFERENCE TO RELATED APPLICATIONS

This application is based upon and claims the benefit of priority of the prior Japanese Patent Application No. 2009-088394, filed on Mar. 31, 2009, the entire contents of which are incorporated herein by reference.

FIELD

The present invention relates to an information terminal device. The present invention relates to, for example, an information terminal device that prevents disconnection of a cable electrically connecting between two housings that are movably connecting with each other and that reduces the number of components thereof.

BACKGROUND

In recent years, there has been wide use of an information terminal device, such as a mobile phone, which is rotatable and slidable by connecting, via a given connection mechanism, a fixed side housing having an operation unit such as a key to a movable side housing having a display unit.

In the above-described information terminal device, electrical connection is formed between the two housings. A substrate inside the fixed side housing is electrically connected to a substrate inside the movable side housing with a cable such as a thin-wire coaxial cable. The above-described cable may be caught in a joint part between the housings or may be disconnected by being interfered with other components inside the housings when the information terminal device is being assembled.

Therefore, as a conventional cable protecting structure for avoiding cable disconnection, there is a suggested storage structure of a cable that has a holding unit for positioning in a state where the side surface of another end portion side of the cable whose end portion is connected to the substrate of the movable side housing is held.

In the information terminal device movably connecting the fixed side housing to the movable side housing, a relative position of the movable side housing with respect to the fixed side housing is transited according to movement of the movable side housing. To detect the relative position of the movable side housing with respect to the fixed side housing, the fixed side housing is generally provided with a detection sensor.

As for the conventional information terminal device, a holding member used to hold the detection sensor, as a separate component apart from the cable protecting structure, is assembled to the fixed side housing.

[Patent Document 1] Japanese laid-open Patent Publication No. 2008-103989

However, as for the conventional information terminal device, there is a problem that it is difficult to assemble a cable to a housing. Specifically, as for the conventional information terminal device, a mounting position of the cable is deviated when the cable is assembled to the fixed side housing. Thus, the cable may be caught in the joint part of the housings or interference between the cable and the other components may occur. As a result, the cable may be disconnected.

In the conventional information terminal device, different components are used for the protecting structure of the cable and for the holding member used to hold the detection sensor. Therefore, the number of the components is increased, and complicated processing procedures such as assembling of holding members are increased. This causes a problem that the device cost is increased.

SUMMARY

According to an aspect of the invention, an information terminal device that includes a first housing electrically and movably connected to a second housing via a cable, the first housing includes a first substrate, a cable guide member having a portion of the cable therein so that the cable guide member guides an end portion of the cable to the first substrate, and a cable cover member which integrally includes a cable surrounding unit which covers the portion of the cable in the cable guide member and a sensor holding unit which holds a detection sensor for detecting the position of the second housing in relation to the first housing.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

With reference to the figures, detailed description will be made below of an embodiment of an information terminal device pursuant to the present invention. Specifically, description will be made of an example when the information terminal device pursuant to the present invention is applied to a rotatable mobile phone. The information terminal device disclosed in the present invention may be applied to an information terminal device having a plurality of communication forms, such as a slidable mobile phone, and the like.

Figure 1:
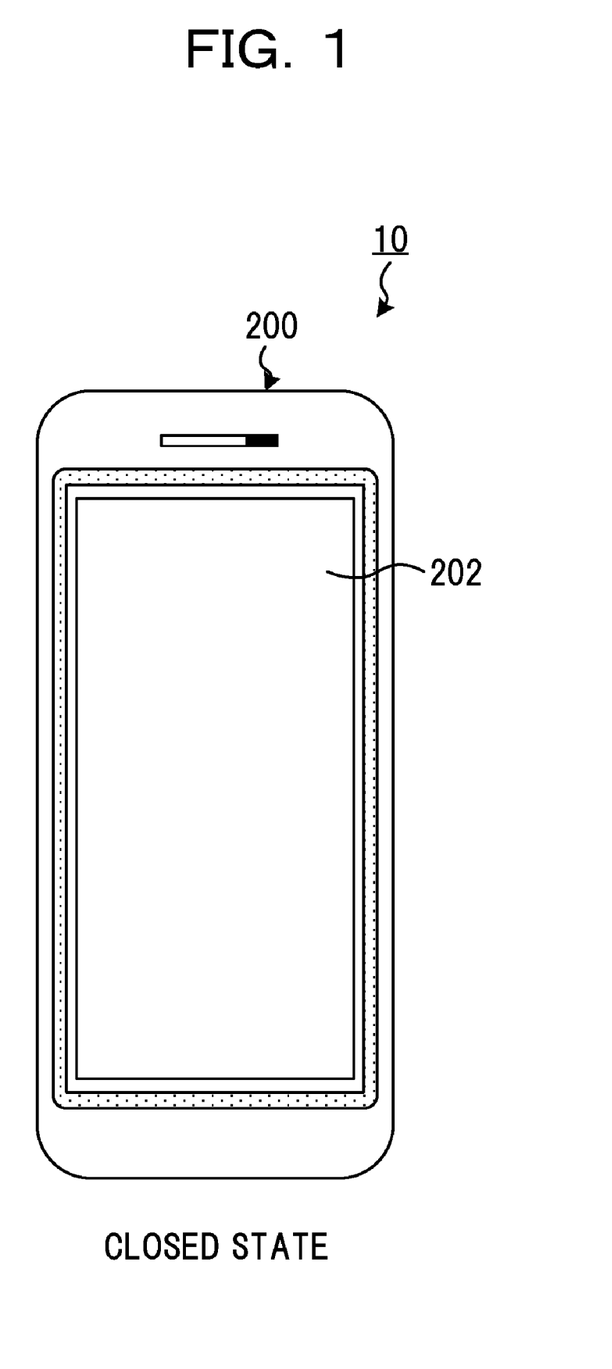
FIG. 1 is a plan view illustrating a configuration of a mobile phone according to the present embodiment in a closed state.
Figure 2:
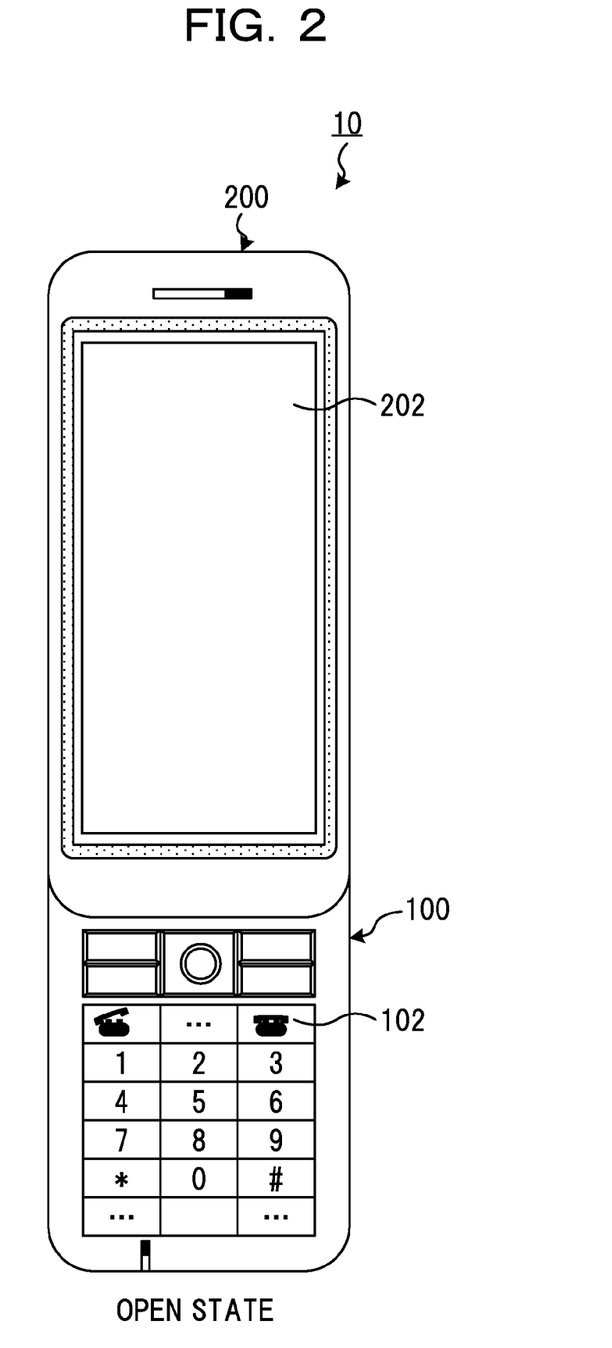
FIG. 2 is another plan view illustrating a configuration of the mobile phone according to the present embodiment in an open state.
Figure 3:
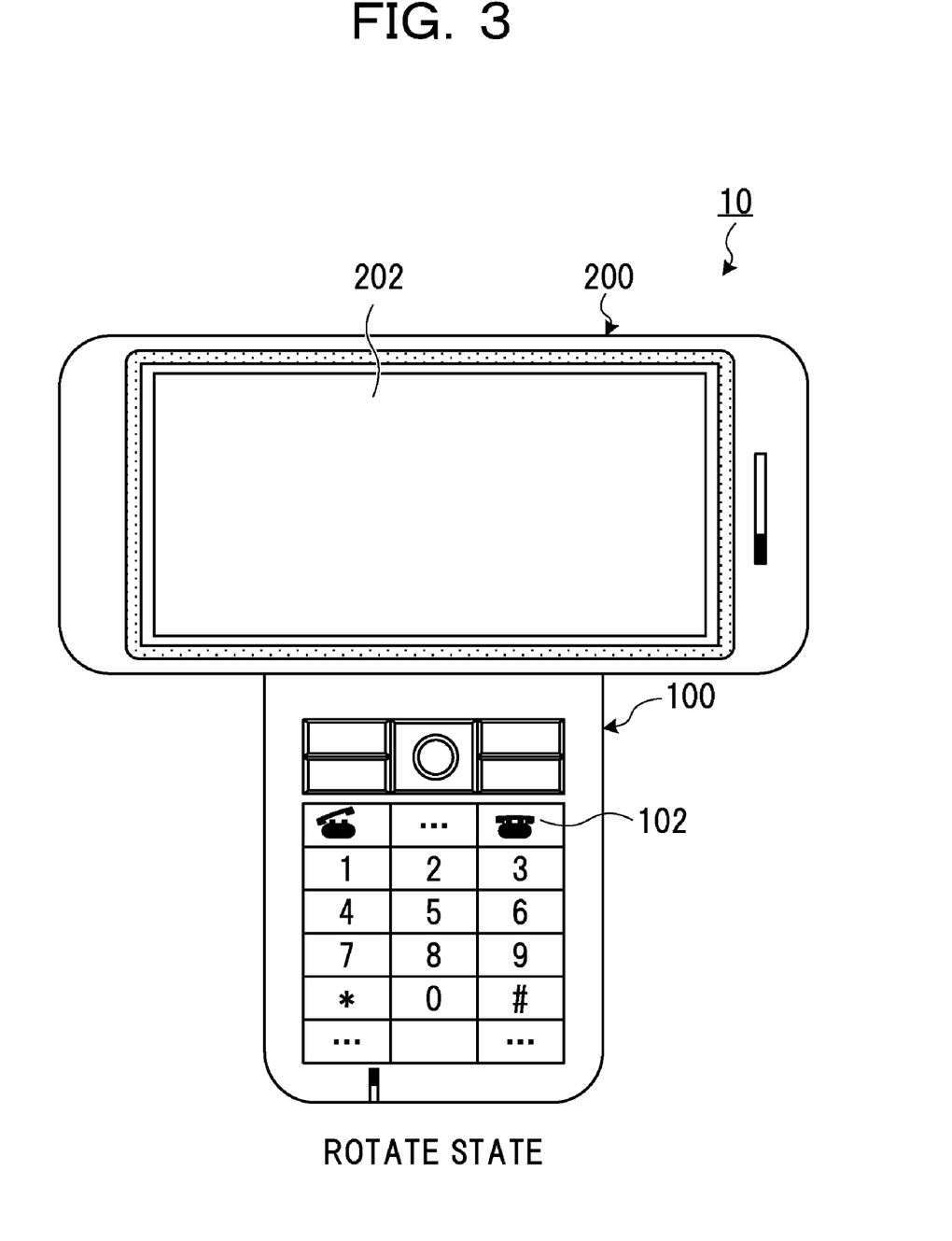
FIG. 3 is another plan view illustrating a configuration of the mobile phone according to the present embodiment in a rotated state.
Figure 4:
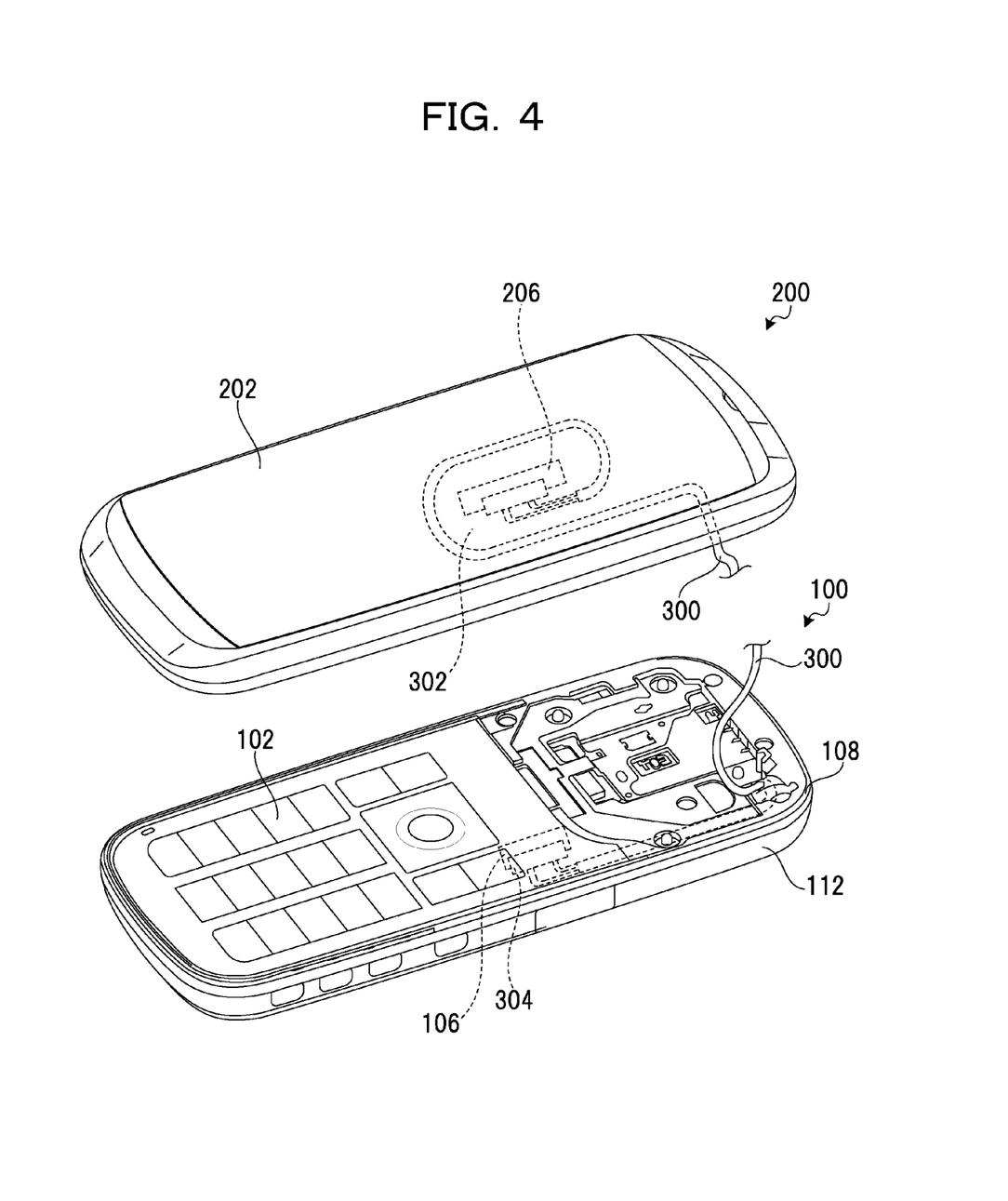
FIG. 4 is an exploded perspective view illustrating a state in which a fixed side housing and a movable side housing making up the mobile phone according to the present embodiment are separated.

Description will be given of a configuration of a mobile phone 10 according to the present embodiment. FIG. 1, FIG. 2, and FIG. 3 are diagrams illustrating a configuration of the mobile phone 10 according to the present embodiment. FIG. 4 is an exploded perspective view illustrating a state where a fixed side housing 100 and a movable side housing 200 that are making up the mobile phone 10 according to the present embodiment are separated.

As illustrated in FIG. 1 to FIG. 3, the mobile phone 10 includes the fixed side housing 100 as a first housing and the movable side housing 200 as a second housing. The movable side housing 200 is movably connected in relation to the fixed side housing 100 via a connection mechanism (not illustrated). As illustrated in FIG. 4, the mobile phone 10 includes a cable 300 that is arranged between the fixed side housing 100 and the movable side housing 200.

The fixed side housing 100 is provided with an operation pad 102 as an operation unit having a plurality of keys such as a code key and a cursor key. The movable side housing 200 is provided with a display panel 202 as a display unit that includes a Liquid Crystal Display (LCD) element and the like. The connection mechanism is provided between the fixed side housing 100 and the movable side housing 200 and includes a sliding mechanism in which the fixed side housing 100 is slidably connected to the movable side housing 200 and a movable mechanism such as a rotating mechanism in which the fixed side housing 100 is rotatably connected to the movable side housing 200.

The cable 300 is a signal line formed by bundling a plurality of thin-wire coaxial cables. A movable side housing connector 302 and a fixed side housing connector 304 are connected to both ends of the cable 300, respectively.

Figure 5:
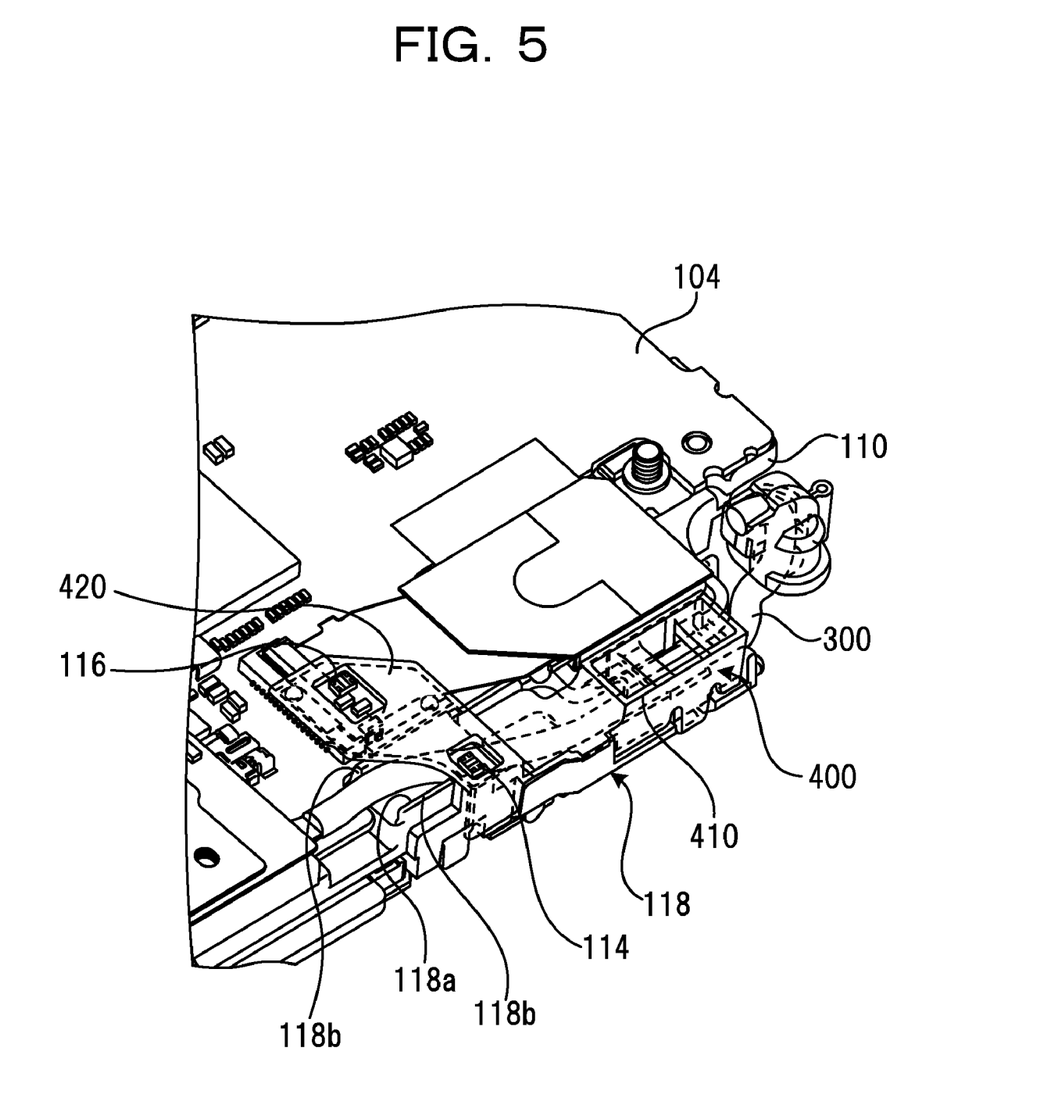
FIG. 5 is a perspective diagram illustrating an internal configuration around a cable of the fixed side housing.

The fixed side housing 100 has an internal substrate 104 mounted therein (see FIG. 5). In the internal substrate 104, a connector linking unit 106 is formed to transmit and receive electronic signals and electronic power. The movable side housing 200 is also mounted with an internal substrate (not illustrated) in which a connector linking unit 206 is formed.

The movable side housing connector 302 on the movable side housing end portion the cable 300 is connected to the connector linking unit 206 of the movable side housing 200. The fixed side housing connector 304 on the fixed side housing end portion of the cable 300 is connected to the connector linking unit 106 of the fixed side housing 100.

As for the mobile phone 10 according to the present invention, the internal substrate 104 of the fixed side housing 100 is electrically connected to the internal substrate of the movable side housing 200 via the cable 300. The mobile phone 10 transmits and receives electric signals between the electronic components mounted on each of the substrates and supplies electric power.

By sliding or rotating the movable side housing 200 in relation to the fixed side housing 100 by the connection mechanism, the mobile phone 10 according to the present embodiment is repositionable between the closed state illustrated in FIG. 1, the open state illustrated in FIG. 2, or the rotating state illustrated in FIG. 3.

The closed state illustrated in FIG. 1 is a state in which the fixed side housing 100 and the movable side housing 200 are overlapped in the largest overlapping area. In the closed state, the longitudinal length of the mobile phone 10 is at its shortest. Therefore, the mobile phone 10 is set to the closed state, for example, when being carried or performing a simple function such as viewing of a speech communication history or information on the Internet or the like.

The open state illustrated in FIG. 2 is a state in which the fixed side housing 100 and the movable side housing 200 are overlapped in the smallest overlapping area. In the open state, the longitudinal length of the fixed side housing 100 is at its longest. In the open state, an operation pad 102 of the fixed side housing 100 is exposed. Therefore, the mobile phone 10 is set to the open state when a user performs operation for making a call or writing an outgoing mail or the like by using the operation pad 102.

A rotating state illustrated in FIG. 3 is a state in which the movable side housing 200 is rotated by 90 degrees in relation to the fixed side housing 100 from the open state illustrated in FIG. 2. In this case, the display panel 202 is oblong. Thus, the mobile phone 10 is set to the rotating state when a user watches TV (One Seg broadcasting), views information on the Internet and received mails, plays games, or the like.

With reference to FIG. 5, description will be made of an internal structure surrounding the cable 300 of the fixed side housing 100. FIG. 5 is a respective view of the internal structure surrounding the cable 300 of the fixed side housing 100.

As illustrated in FIG. 5, the fixed side housing 100 includes a fixed front case 108 (see FIG. 4), an internal substrate 104, a substrate base member 110, and a fixed rear case 112 (see FIG. 4). Detection sensors 114 and 116 and a cable cover member 400 are allocated between the fixed front case 108 and the fixed rear case 112.

The fixed front case 108 and the fixed rear case 112 are assembled by fixing with screws. The fixed front case 108 and the fixed rear case 112 form a storage space inside to store the internal substrate 104, the substrate base member 110, the detection sensors 114 and 116, the cable cover member 400, and the like. The internal substrate 104 is fixed at the substrate base member 110 and has various electronic components.

The substrate base member 110 forms a fixing unit that fixes the internal substrate 104. The cable guide member 118 is integrally formed around the fixing unit. The cable guide member 118 is mounted with the fixed side housing connector 304 (i.e., the fixed side housing portion of the cable 300) of the cable 300 to guide the fixed side housing end portion of the cable 300 to the internal substrate 104. The cable guide member 118 is formed in an approximately U-shape with an open top and has a bottom surface unit 118a and side surface unit 118b covering the bottom and side surfaces of the cable 300, respectively. The cable guide member 118 is mounted with the cable 300 in the bottom surface unit 118a and is controlled by the side surface unit 118b to guide the cable 300 to the internal substrate 104.

The detection sensors 114 and 116 are electrically connected to the internal substrate 104 via a connection member such as a flexible cable (not illustrated) or the like. The detection sensors 114 and 116 detect a relative position of the movable side housing 200 in relation to the fixed side housing 100 shifting according to movement of the movable side housing 200. Specifically, the detection sensors 114 and 116 may be a magnetic sensor such as a Magnetism Resistance (MR). The detection sensors 114 and 116 detect the relative position of the movable side housing 200 by detecting approach of a magnet mounted in a given position in the movable side housing 200.

The fixed side housing 100 and the movable side housing 200 have an area in which the fixed side housing 100 and the movable side housing 200 are always overlapped (hereinafter referred to as "overlapping area") when the mobile phone 10 is in the closed state illustrated in FIG. 1, the open state illustrated in FIG. 2, or the rotating state illustrated in FIG. 3. The detection sensors 114 and 116 are allocated in a space, which includes the overlapping area, in a thickness direction of the fixed side housing 100. According to the present embodiment, when the detection sensors 114 and 116 are allocated in the space, the detection sensor 114 detects the relative position of the movable side housing 200 in the open state, and the detection sensor 116 detects the relative position of the movable side housing 200 in the rotating state.

The cable cover member 400 is locked to the cable guide member 118 in a state where the fixed side housing portion of the cable 300 is disposed in cooperation with the cable guide member 118 formed on the substrate base member 110.

In the mobile phone 10 according to the present embodiment, the cable 300 is disposed on the cable guide member 118 when being stored inside a cable surrounding unit 410 of the cable cover member 400. The detection sensors 114 and 116 are held in a sensor holding unit 420 of the cable cover member 400.

The mobile phone 10 according to the present embodiment prevents disconnection of the cable 300 by preventing position deviation when the cable 300 is mounted, and may enable a single cable cover member 400 to perform a function for protecting the cable 300 and a function for holding and positioning the detection sensors 114 and 116.

Figure 6A:
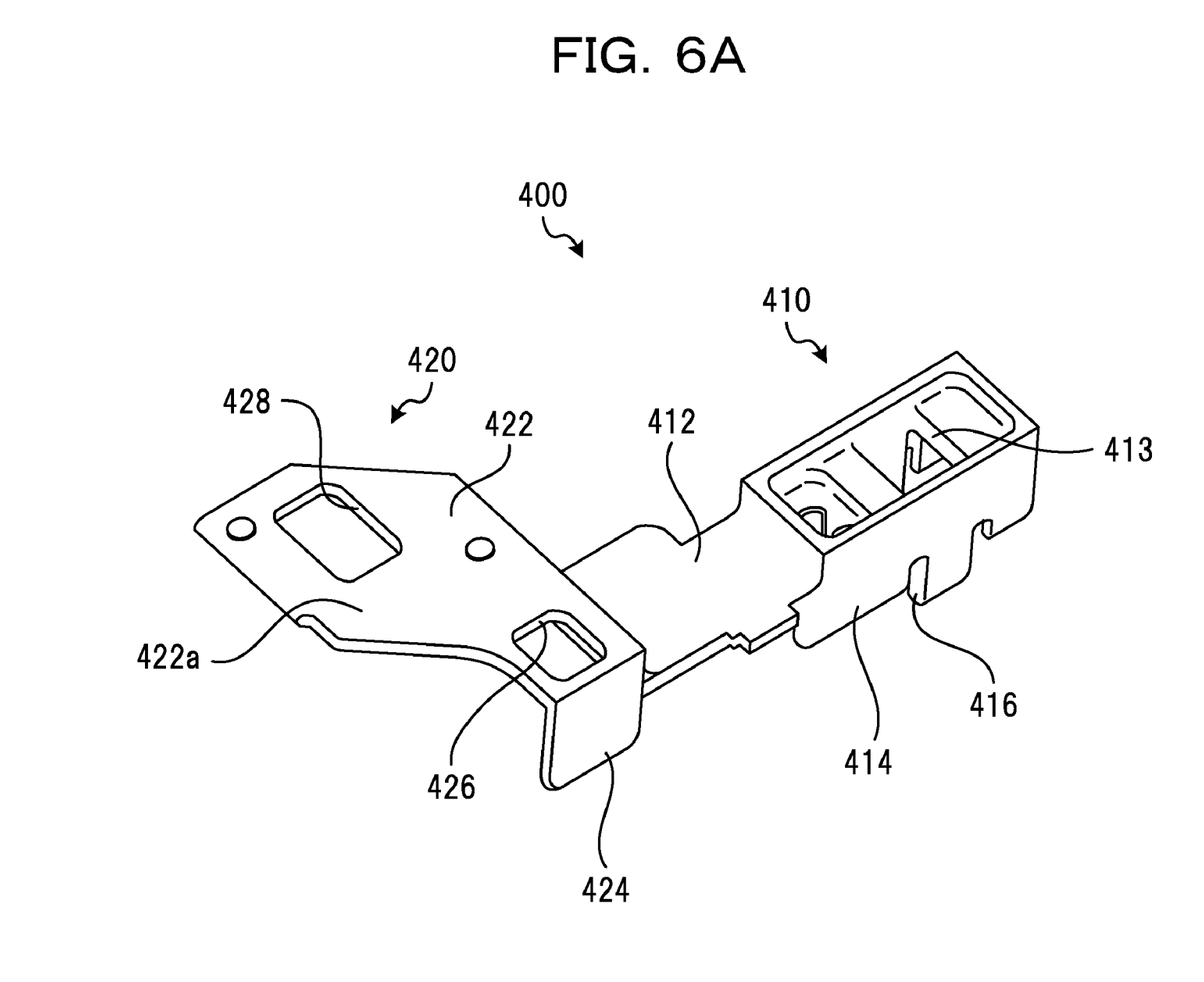
FIG. 6A is a top perspective view illustrating a whole structure of a cable cover member.
Figure 6B:
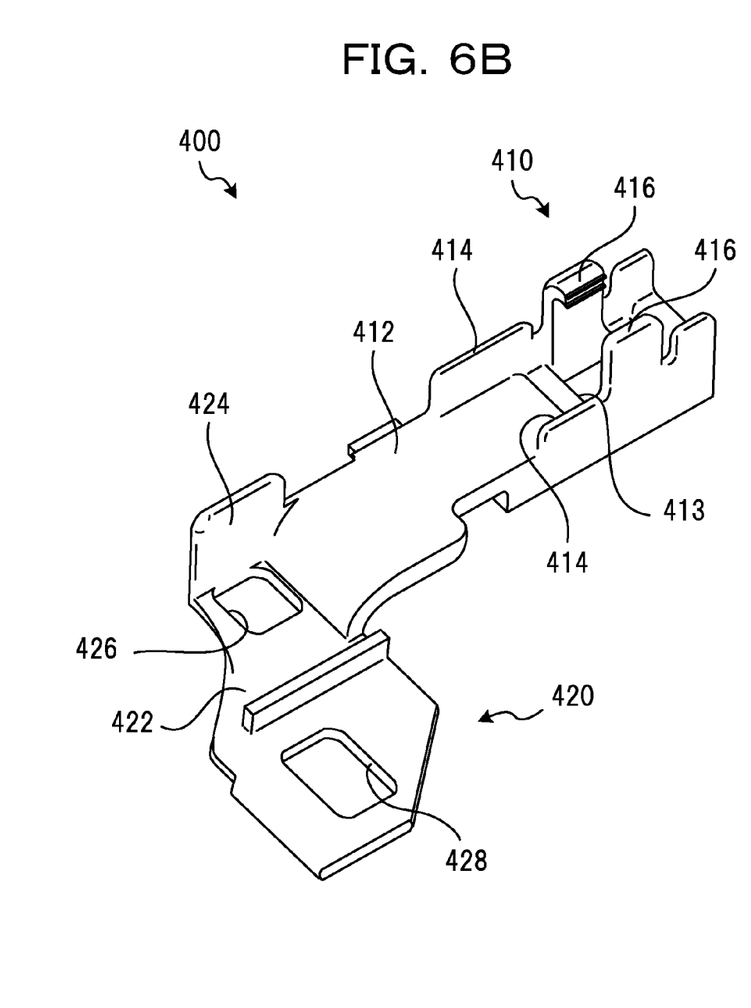
FIG. 6B is a bottom perspective view illustrating the whole structure of the cable cover member.

With reference to FIG. 6A and FIG. 6B, detailed description will be made of a configuration of the cable cover member 400. FIG. 6A is an upper surface perspective view of a whole configuration of the cable cover member 400. FIG. 6B is a lower surface perspective view of the whole configuration of the cable cover member 400.

As illustrated in FIG. 6A and FIG. 6B, the cable cover member 400 is formed in an approximately L-shape in a whole view. The cable cover member 400 is integrally provided with the cable surrounding unit 410, which covers the fixed side housing portion of the cable 300 in cooperation with the cable guide member 118, and the sensor holding unit 420 that holds the detection sensors 114 and 116.

The cable surrounding unit 410 is formed in an approximately U-shape in a cross-sectional view. The cable surrounding unit 410 includes a flat plate unit 412 and a pair of side surface units 414 that are located at both sides of the flat plate unit 412. The flat plate unit 412 is allocated face to the bottom surface 118a of the cable guide member 118 and covers the fixed side housing portion of the cable 300 mounted on the bottom surface unit 118a to prevent detachment of the cable 300 from the cable guide member 118.

An opening part 413 is formed in a part of the flat plate unit 412. The opening part 413 makes the fixed side housing portion of the cable 300, mounted on the bottom surface unit 118a of the cable guide member 118a, visible to the outside. This makes it possible to visually confirm a protection state or a wiring state of the cable 300 from the opening part 413. Therefore, the cable route of the cable 300 may be stable and position deviation of the cable 300 may be prevented.

The side surface unit 414 is abutted on a side surface unit 118b of the cable guide member 118 and prevents position deviation toward the side of the cable cover member 400 with respect to the cable guide member 118.

A hook unit 416 is formed in a part of the side surface unit 414. The hook unit 416 is engaged with the back surface of the bottom surface unit 118a of the cable guide member 118. Accordingly, the cable cover member 400 is hooked to the cable guide member 118. When the cable cover member 400 is hooked to the cable guide member 118 by the hook unit 416, the cable cover member 400 may be positioned and fixed to the cable guide member 118 surely and easily without using a separate component for fixing such as a screw or an adhesive tape.

The sensor holding unit 420 is formed in an approximately L-shape in a cross-sectional view. The sensor holding unit 420 includes a flat plate unit 422 and a side surface unit 424 that is located on one side of the flat plate unit 422. The side surface unit 424 is abutted on the side surface unit 118b of the cable guide member 118 and prevents position deviation toward a side of the sensor holding unit 420 having the cable cover member 400 with respect to the cable guide member 118.

Holding holes 426 and 428 are drilled on the flat plate unit 422. The holding holes 426 and 428 hold the detection sensors 114 and 116, respectively.

On the top surface of the flat plate unit 422, a pasted fixed surface 422a on which the detection sensors 114 and 116 are electrically connected to the internal substrate 104 of the fixed side housing 100 is formed, so that the detection sensors 114 and 116 may be surely positioned in the holding holes 426 and 428.

As described above, according to the present embodiment, the fixed side housing 100 includes a cable guide member 118 that is mounted with the fixed side housing portion of the cable 300 for connecting the cable from the movable side end portion of the cable connected to the internal substrate of the movably side housing 200 by guiding the fixed side housing end portion of the cable 300 to the internal substrate 104 of the fixed side housing 100, and includes a cable cover member 400, which is locked to the cable guide member 118 and integrally includes the cable surrounding unit 410 surrounding the fixed side housing portion of the cable 300 in cooperation with the cable guide member 118 and the sensor holding unit 420 holding the detecting sensors 114 and 116.

This makes it possible to prevent position deviation when the cable 300 is mounted and to prevent the cable 300 from being caught in the joint part of the fixed side housing 100, and to prevent interference of the cable 300 and the other components of the fixed side housing 100. As a result, disconnection of the cable 300 may be prevented.

A single cable cover member 400 may be used for the function for protecting the cable 300 and the function for holding and positioning the detection sensors 114 and 116. This makes it possible to reduce the number of the components and thereby realize cost reduction.

Although the embodiments of the present invention has been described in detail, it should be understood that the various changes, substitutions, and alterations could be made hereto without departing from the spirit and scope of the invention.

For example, the above-described embodiment has illustrated an example of the case where the fixed side housing 100 is provided with the detection sensors 114 and 116, the cable guide member 118, and the cable cover member 400. However, the present invention is not limited to this example. The detection sensors 114 and 116, the cable guide member 118, and the cable cover member 400 may be dispersedly provided to either the fixed side housing 100 or the movable side housing 200.

In the above-described embodiment, description has been made of an example of a case where a mobile phone is used as an information terminal device. However, the present invention is not limited to this example. For example, the information terminal device according to the present embodiment may be a small information processing terminal such as Persona Digital Assistants (PDA), a small music player, a portable television, a portable game machine, and the like.

According to one of the embodiments of the information terminal device disclosed in the present invention, the present invention has an advantage in that it is possible to prevent disconnection of a cable used to electrically connect two housings that are movably connected with each other. According to one of the embodiments of the information terminal device disclosed in the present invention, the present invention has an advantage in that cost reduction may be realized by reducing the number of the components.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although an embodiment of the present invention has been described in detail, it should be understood that various changes, substitutions, and alterations could be made hereto without departing from the spirit and scope of the invention.

What is claimed is:

1. An information terminal device comprising:
   a first housing, and
   a second housing electrically and movably connected to a the first housing via a cable,
   the first housing including,
   a first substrate,
   a cable guide member wherein a portion of the cable is positioned in the cable guide member and a first end of the cable is guided to the first substrate by the cable guide member, and
   a cable cover member which integrally includes a cable surrounding unit and a sensor holding unit and is locked to the cable guide member,
   wherein the cable surrounding unit covers the portion of the cable positioned in the cable guide member, and
   wherein the sensor holding unit holds a detection sensor which detects a position of the second housing in relation to the first housing.

2. The information terminal device according to claim 1, wherein the cable surrounding unit is provided with a fastening unit which is used to secure the cable cover member on the cable guide member.

3. The information terminal device according to claim 1, wherein the cable surrounding unit is provided with an opening part which exposes the portion of the cable positioned in the cable guide member.

4. The information terminal device according to claim 1, wherein the sensor holding unit is provided with a pasting fixing surface on which a connection member is pasted to electrically connect the detection sensor to the first substrate inside the first housing.

* * * * *